UNITED STATES PATENT OFFICE.

STUART GWYNN, OF NEW YORK, N. Y., ASSIGNOR TO AMERICAN METALINE COMPANY, OF SAME PLACE.

IMPROVED COMPOSITION OF MATTER, CALLED "METALINE," FOR JOURNALS, BEARINGS, &c.

Specification forming part of Letters Patent No. 101,866, dated April 12, 1870; antedated March 30, 1870.

*To all whom it may concern:*

Be it known that I, STUART GWYNN, of the city of New York, in the county of New York and State of New York, have invented a new composition of matter, which I denominate "Metaline No. 5," designed for the purpose of journal-boxes, journal-box linings, and other similar articles having surfaces that are intended to be subjected, in use, to friction.

The nature of my invention consists in combining plastic bronze and fused caoutchouc, or their equivalents, upon the principles and in pursuance of the method fully described and illustrated in the specification annexed to my application for Letters Patent for a process for making "metaline," filed in the Patent Office simultaneously herewith, and to which reference is made, whereby I produce a composition of matter having such properties and conditions that so little friction will be caused and so little heat developed in the practical use of the above-named articles made of it in machinery and elsewhere in the arts, that the necessity for the application of oil or any other lubricant to their surfaces is entirely obviated.

To make this composition of matter, I take of bronze that is more or less plastic, within the definition of plasticity contained in the description of my process hereinbefore referred to, ninety-eight parts, and fused caoutchouc, two parts.

The composition of the bronze may be somewhat varied; but I prefer that made of copper, ninety-three parts; tin, six parts; and lead or zinc, one part. It is to be converted into a fine powder, by abrasion or grinding, when near the melting-point.

Then the two are to be intimately incorporated. This will be best done by putting together, first, about equal quantities and grinding them for some time in a hot mill, and then adding the rest of the bronze, a little at a time, while the grinding is going on. The mass is then to be subjected to severe pressure in a mold, to give it the required degree of solidity.

In journal-boxes made or lined with this composition, journals may be practically run at a high rate of speed without a lubricant.

While I intend to limit myself in this specification to plastic compound metals, as plasticity is defined in the specification describing my process for making "metaline," above referred to, for the principal element of said compound, whose conditions need modification to convert it into "metaline," other plastic compound metals besides plastic bronze, its equivalent for the purpose intended, may be employed, and other agents besides fused caoutchouc, its equivalent for the purpose intended, may be used. So, also, the relative proportions of the plastic bronze and fused caoutchouc, or their equivalents above stated, may be varied, within the limits of the process hereinbefore referred to, without departing from the spirit of my invention.

I claim as my invention—

The manufacture or preparation of the composition of matter which I denominate "Metaline No. 5," when the same possesses the properties and is compounded of the ingredients, or the equivalents, in the proportions, by the process, and for the purposes set forth.

STUART GWYNN.

Witnesses:
J. P. FITCH,
HENRY N. MYGATT.